United States Patent
van Basshuysen

[11] 3,938,329
[45] Feb. 17, 1976

[54] EXHAUST GAS DETOXICATION SYSTEM FOR A MOTOR VEHICLE COMBUSTION ENGINE

[75] Inventor: Richard van Basshuysen, Bad Wimpfen, Germany

[73] Assignee: Audi NSU Auto Union Aktiengesellschaft, Neckarsulm, Germany

[22] Filed: Apr. 10, 1974

[21] Appl. No.: 459,663

[30] Foreign Application Priority Data
Apr. 14, 1973 Germany............................ 2318926

[52] U.S. Cl. ...................... 60/284; 60/285; 60/290;
123/117 A; 137/554
[51] Int. Cl.² ......................................... F02B 75/10
[58] Field of Search ............. 60/277, 284, 285, 290, 60/289; 137/554; 123/117 A

[56] References Cited
UNITED STATES PATENTS

| | | | |
|---|---|---|---|
| 2,732,833 | 1/1956 | Hook | 123/117 A |
| 3,205,909 | 9/1965 | Oldfield | 137/554 |
| 3,272,191 | 9/1966 | Walker | 123/117 A |
| 3,685,295 | 8/1972 | Tatsutomi | 60/290 |
| 3,796,049 | 3/1974 | Hayashi | 60/278 |
| 3,824,788 | 7/1974 | Cole | 60/290 |

FOREIGN PATENTS OR APPLICATIONS

| | | | |
|---|---|---|---|
| 782,026 | 8/1957 | United Kingdom | 137/554 |

*Primary Examiner*—Douglas Hart
*Attorney, Agent, or Firm*—Kane, Dalsimer, Kane, Sullivan, and Kurucz

[57] ABSTRACT

An exhaust gas detoxication system for a motor vehicle combustion engine with external ignition includes an air pump driven by the engine to deliver secondary air into the exhaust system. The exhaust system contains a thermal reactor wherein final combustion of as yet unburned constituents of the exhaust gas takes place. Since as the speed of the engine increases, more air is delivered than required for final combustion, a blow-off valve is arranged in the delivery line of the air pump, limiting the flow of air supplied to the exhaust system and in general shutting it off completely at a certain engine speed. Exhaust gas detoxication systems to which the invention relates are provided with a means for shifting to retarded ignition during the warm-up phase of the reactor, whereby elevated temperatures of the exhaust gases and hence a faster response of the reactor are obtained. This retardation of the ignition, however, is injurious at high rotational speeds; and therefore, a speed controlled device overriding this shifting means is provided. This device, at an engine speed above a certain value, actuates a switch that shifts the ignition time to advanced ignition.

1 Claim, 1 Drawing Figure

U.S. Patent Feb 17, 1976 3,938,329
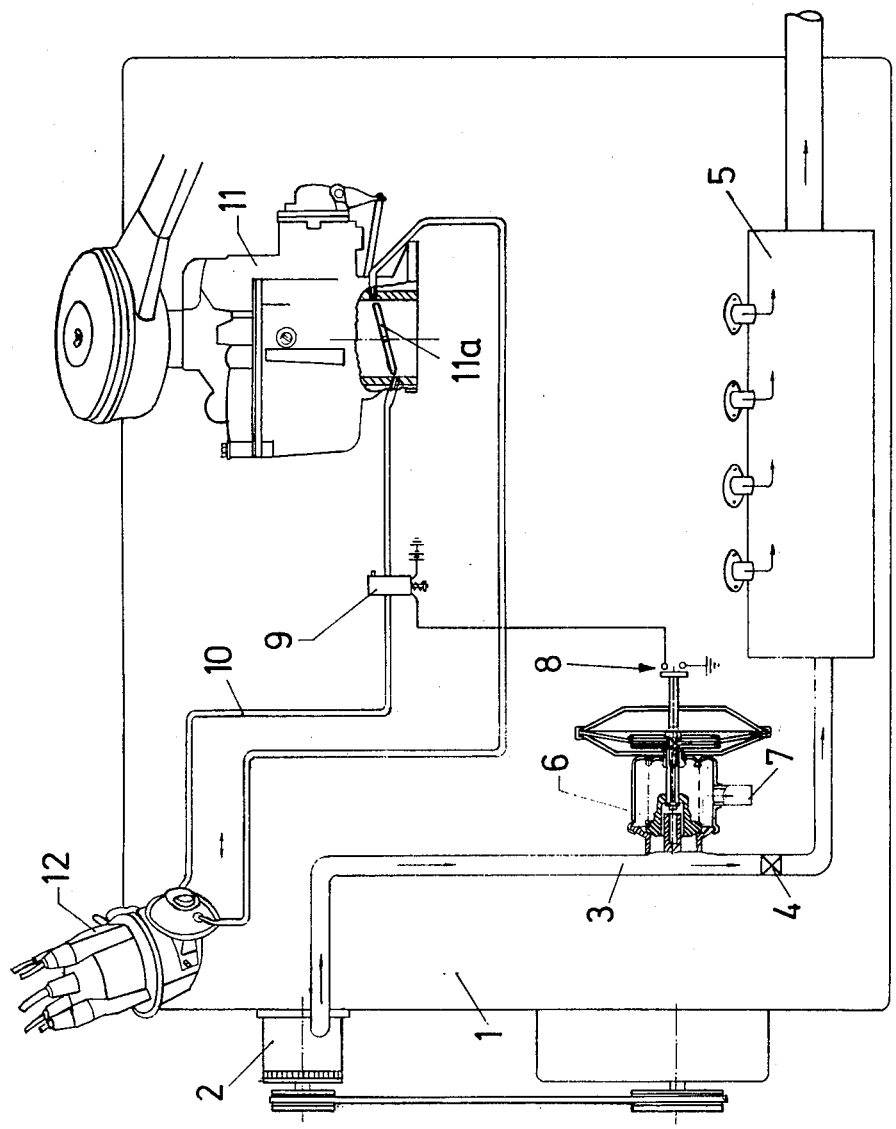

EXHAUST GAS DETOXICATION SYSTEM FOR A MOTOR VEHICLE COMBUSTION ENGINE

BACKGROUND OF THE INVENTION

In one known exhaust gas detoxication system of the prior art, an electric tachometer is employed as the speed controlled device. An instrument of this type is comparatively expensive and consequently somewhat undesirable.

SUMMARY OF THE INVENTION

The object of the invention is to provide simpler means of switching the ignition time to advanced ignition when a certain engine speed is reached.

To achieve this object, it is proposed that the speed controlled device be the blow-off valve.

As aforementioned, the function of the blow-off valve is to throttle down or completely shut off the supply of air to the reactor from a certain engine speed on. The blow-off valve, in other words is likewise speed controlled, and may thus serve as a control for the switch to shift the ignition time to advanced ignition.

The blow-off valve is ordinarily a diaphragm valve, which when a certain air pressure is reached in the delivery line of the air pump, opens a blow-off port generally leading to the outside, and in so doing executes a stroke utilized to actuate the switch shifting the ignition time to advanced ignition.

BRIEF DESCRIPTION OF THE DRAWING

An embodiment of the invention will be described below by way of example with reference to the drawing.

DETAILED DESCRIPTION

An internal combustion engine 1 drives an air pump 2 delivering secondary air by way of a line 3 and a check valve 4, into the thermal reactor 5 of the exhaust system for final combustion of as yet unburned constituents of the exhaust gas. With increasing speed of engine 1 and consequently greater air delivery, a blow-off valve 6 arranged in line 3 opens a blow-off port 7, thus limiting the flow of air supplied to the reactor 5 and shutting it off from a certain rotational speed on. In so doing, the blow-off valve 6 executes a stroke, closing a circuit by way of a contact 8. The switch 9 actuated thereby, arranged in the suction line 10 opening into the carburetor 11 downstream from the throttle 11a and connected to the distributor 12, causes the time of admission to be shifted to advanced ignition. The retarded ignition provided during the warm-up phase of the reactor is thus overriden, and can do no harm at speeds above a certain value.

Thus the several aforenoted objects and advantages are most effectively attained. Although several somewhat preferred embodiments have been disclosed and described in detail herein, it should be understood that this invention is in no sense limited thereby and its scope is to be determined by that of the appended claims.

What is claimed is:

1. An exhaust gas detoxication system for a motor vehicle combustion engine with external ignition comprising a distributor, an intake system comprising a carburetor with a throttle and an exhaust system with a reactor, said detoxication system having an air pump driven by the engine to deliver secondary air into the exhaust system, a blowoff valve arranged in the delivery line and having a valve body executing a stroke for opening a blowoff port when engine speed exceeds a certain value to regulate the flow of air supplied to the exhaust system, a means to shift the ignition time to retarded ignition during the warm-up phase of the reactor, said means comprising a suction line between the carburetor downstream from the throttle and the distributor, an electrically-actuated valve in said suction line for shifting the ignition time to advanced ignition at an engine speed of above said value, a switch in the electrical connection of said electrically-actuated valve, said switch being actuated by said valve body of the blowoff valve at said certain engine speed.

* * * * *